Dec. 6, 1960  E. C. LUCKENBACH  2,963,421
CATALYTIC CONVERSION AND STRIPPING SYSTEM WITH HEAT EXCHANGE
Filed March 26, 1958
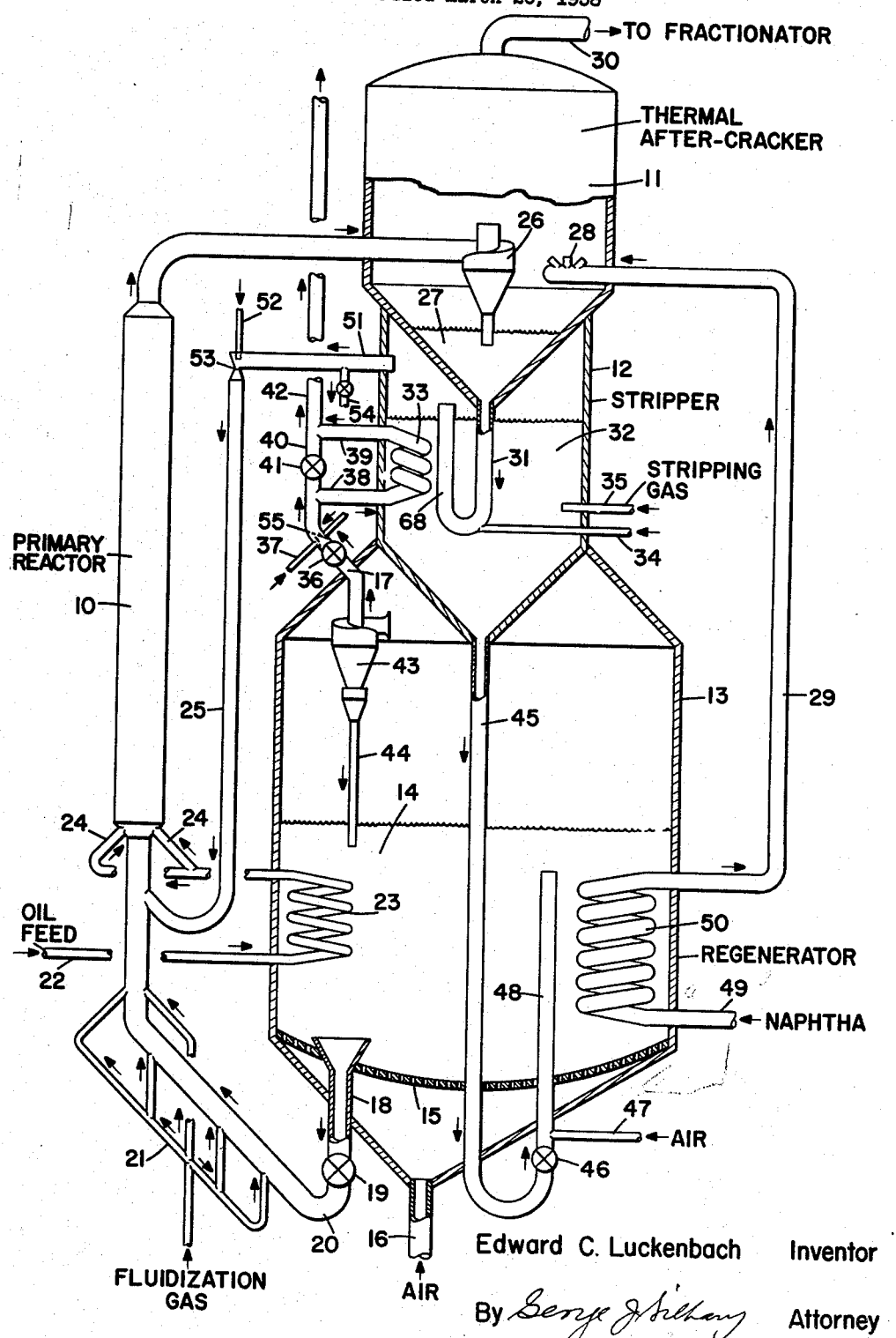
Edward C. Luckenbach  Inventor
By _George J. Hilbery_  Attorney

United States Patent Office 2,963,421
Patented Dec. 6, 1960

2,963,421

CATALYTIC CONVERSION AND STRIPPING SYSTEM WITH HEAT EXCHANGE

Edward C. Luckenbach, Roselle Park, N.J., assignor to Esso Research and Engineering Company, a corporation of Delaware Filed Mar. 26, 1958, Ser. No. 724,081

16 Claims. (Cl. 208—150)

The present invention is concerned with an improved apparatus and process features for converting hydrocarbon oils to lighter, more valuable products. More particularly, it deals with rapid, low conversion catalytic treatment of oil feed, followed by a relatively high degree of thermal cracking of the catalytic step effluent.

With the increasing difficulty of maintaining crude petroleum resources, the necessity of converting hydrocarbon oil to the most valuable product distribution has assumed greater importance in the general economy, and particularly in the efficient operation of a petroleum refinery. The use of fluid bed techniques for effecting catalytic cracking is well known in the art. Briefly summarized, a suitably preheated oil feed is injected into a turbulent bed of catalytic particles maintained generally at a temperature of 900–1200° F., the oil being converted to desired lighter fraction upon contact with the solids. Normally, a portion of the catalytic particles, coated with carbon during the course of the reaction, are passed to a regeneration zone, wherein combustion of deposited carbonaceous materials heats them to sufficiently high temperature so as to enable them to supply requisite thermal energy upon being recirculated to the conversion zone. In somewhat similar fashion, the transfer line type of reaction system, i.e. flowing dispersed solids, for producing light ends products has been known in the prior art teachings.

However, heretofore, both fluid bed and transfer line systems have presented important disadvantages. Product distributions are a good deal less than optimum in view of the nature of the oil feed material. In fluid bed operations, relatively large volumed vessels are required because of the considerable solids inventory necessary for continuous operation. In the prior art systems, good control over stripping time and temperature was not readily obtained. Generally, the equipment for both fluid bed and transfer line operations take up a relatively large refinery site. Considerable energy (in the form of high velocity propelling gas, lifts, etc.) was required to transport the large quantities of solids between the various processing vessels.

The present invention sets forth a method and apparatus for more efficiently converting oil feed stocks to desirable product distributions. Improved means for catalytically cracking hydrocarbons in a low conversion, first or primary reaction zone and subjecting the products of the first stage to a relatively high degree of thermal after-cracking in a second reaction zone are taught. More specifically, means for effecting both these reaction steps, stripping and regeneration are set forth in a system characterized by a combination of processing features, including among others, simultaneous naphtha thermal reforming while providing thermal after-cracking heat, use of stripping gas and stripped hydrocarbons as propellant gases for the short time, catalytic cracking step, and controlling after-burning of regenerator flue gas for heating the stripping zone. The apparatus employed is characterized by an elongated or transfer line type reaction zone operating in conjunction with a stacked vessel structure having positioned, consecutively upwards, a regeneration zone, a stripping zone and a thermal cracking zone. The stripping zone thus serves as an effective seal between the hydrocarbon treating zones and the regenerator zone, and gravity flow is largely used through the system thus reducing overall energy requirements.

The various aspects and modifications of the present invention will be made more clearly apparent by reference to the following description, example and accompanying drawing.

The drawing depicts the preferred mode and apparatus for converting hydrocarbon oil in accordance with the present invention.

Fundamentally, the system comprises low conversion zone, conduit-like reactor 10, thermal cracker 11, stripping zone 12 and regenerator 13. As is illustrated, the latter three processing units are arranged in superposed relationship with respect to each other, thus enabling solids to pass downwardly by gravity, going from the thermal cracking step to the stripper to be stripped of occluded hydrocarbons, and thence to the regeneration zone for activation of the surface of the catalytic particles. The transfer line or conduit 10 is external to the stacked vessels. By employing the specific apparatus configuration indicated, solids circulation difficulties are reduced, construction costs are lowered due to the use of a common circumscribing shell structure, and the overall distances (piping etc.) the solids travel in being processed in these three stages are kept to a minimum.

Directing attention towards the process aspects of the present combination system, there is maintained in regenerator 13 a mass 14 of catalytic reaction solids undergoing combustion of carbonaceous surface deposits acquired during the course of the catalytic reaction, as will be later described. Any conventional type of catalytic solids, natural or synthetic, may be adapted for use in the present process. By way of example, although not limiting, various clays such as bentonite, acid activated natural earths, silica and alumina mixtures or precipitated gels, silica-magnesia, material containing nickel, iron, cobalt, magnesium, vanadium, chromium, molybdenum and the like are employed. The solids are less than 1000 microns in diameter, preferably ranging from 0 to 150 microns in size.

Oxygen-containing gas, such as air, is primarily introduced into the regeneration zone by inlet 16, passing upwardly through bed supporting distribution grid 15 into solids mass 14. While a grid is shown, numerous other means for insuring uniform gas-solids contact may be employed. The air is introduced in sufficiently large amounts to supply requisite oxygen while maintaining mass 14 in the form of a relatively dense, fluidized solids bed. If desired, other fluids, such as steam, combustible materials, etc. may be additionally injected into regenerator 13.

The combustion reaction in the regenerator serves to heat the solids to a temperature in the range of about 1000° to 1300° F., hot flue gas being withdrawn overhead. After passing through separator 43, i.e. one or more cyclones, it is advantageously utilized to supply heat to the various process steps as will be later further described. Separated entrained catalyst particles are returned to the regenerator bed by dipleg 44 thus keeping catalyst loss and air pollution at a minimum.

A portion of the hot solids is continuously withdrawn through exit passageway 18 and passed to the lower portion of reaction zone 10. Valve 19 and the quantities of fluidization gas, e.g. steam, introduced through multiple taps 21, serve to effectively control solids circulation rates. It is generally preferred to utilize a sharp angled bend connection 20, e.g. 30° to 45°, in order to minimize vessel elevation.

Steam introduced through taps 21, together with the vaporous effluent of the stripping zone (steam and stripped hydrocarbon) introduced into the reactor by line 25, serve to propel the catalytic solids upwardly in the form of a rapidly moving, dilute solids-gas suspension. The upflowing stream of catalytic solids generally characterized by a density in the range of 2 to 15 lbs./cu. ft., and a velocity of greater than 15 ft./sec. The overall steam concentration in reactor 10 ranges from 0.5 to 20 wt. percent based on total feed, preferably 8 to 12 wt. percent so as to favor desired product distribution as well as suppress contamination.

A hydrocarbon oil feed such as a virgin gas oil, either preheated by means of coil 23 immersed in regenerator bed 14 or by other means not shown, is introduced by means of line 22 and one or more feed nozzles 24 disposed about reaction zone 10 to ensure good feed distribution into the flowing solids stream. An exceedingly wide range of hydrocarbon oils may be readily employed as feed to the present system. Among other fractions, virgin gas oil, light or heavy naphtha, distillate stock, etc. are suitable. It is generally preferred to utilize a feed material boiling in the range of 600° to 1100° F.

The oil upon contact with the hot catalytic particles, generally at temperatures of 850° to 1000° F., is converted to light gasiform material and coke, the coke depositing on the contact solids. The total solids-gas suspension, containing steam, volatilized but unconverted feed, catalytic cracking products, catalyst particles etc., are passed rapidly through the reaction chamber into separator 26 wherein solids are de-entrained. Separator 26 is conveniently a rough cut cyclone located in the bottom portion of thermal cracker 11, although various separators or cyclones, a tangential inlet or the like, may be alternatively employed.

It is necessary that hydrocarbons be rapidly separated from the catalyst particles, and that only a relatively small fraction of the oil feed to reactor 10 undergo actual catalytic cracking to other materials. Thus, the reactor length, fluidizing gas velocity and the position of separator 26 are chosen so that hydrocarbons are separated from the stocks in less than 5 seconds from the time of their introduction into reactor 10. Conversion in reactor 10 is generally less than 60 wt. percent.

The gaseous effluent of reactor 10 is then subjected to relatively long time, thermal treatment in thermal cracking zone 11. Temperatures of about 900 to 1100° F. and a residence time of at least 10 seconds are normally employed to effect the desired degree of thermal breakdown of heavy hydrocarbon fractions to lighter products, e.g. 5 to 20 wt. percent of the gasiform feed materials, is thermally cracked without causing excessive degradation to coke.

The thermal cracking is preferably done in the vapor phase, heat being supplied by one or more of the following means: hot naphtha vapors, superheated steam and/or the sensible heat of the reaction product vapors themselves.

In a preferred embodiment of the present invention, a naphtha fraction is simultaneously thermally reformed while serving to supply added heat to the thermal cracking step. Briefly described, a naphtha fraction such as a virgin naphtha flows through line 49 into coil 50 at a rate of about 15 wt. percent of the total feed charged to the transfer line, wherein it undergoes indirect heat exchange with the hot, burning solids of regenerator 13, thus being heated to a temperature of about 900° to 1100° F. The ratio of naphtha/hydrocarbon feed will normally correspond to the percentage of naphtha initially present in the crude oil to be processed in accordance with the present invention. Thus, generally 5 to 30 wt. percent of naphtha is utilized in the thermal reforming embodiment, as described. The hot naphtha vapors then are circulated by line 29, through distributor 28 into thermal cracking zone 11, wherein they additionally serve as a heat source while undergoing thermal reforming to hydrocarbons of increased octane and improved volatility. If desired, a portion of the thus reformed naphtha may be directly removed from line 29 by means, not shown. Thus naphtha fractions are subjected to thermal reforming by utilization of excess heat of the regenerator zone above that required for primary feed conversion, thus producing higher octane gasoline, while serving as the heat carrier to a vapor phase, thermal after-cracking zone wherein primary reaction zone vapors are upgraded. Heat transfer is therefore accomplished while upgrading two hydrocarbon streams.

Total gaseous conversion products are withdrawn overhead through exit 30 and passed to fractionating units and other conventional product recovery steps, not shown. It may be desirable, under certain conditions of operation, to recycle a portion of the material separated by fractionation and/or condensation (usually the heavier ends) to the catalytic reaction zone 10, and/or thermal cracker 11 for additional conversion treatment.

Returning to the solids flow pattern, separated catalytic solids accumulate in the lower portion of thermal cracker 11 forming solids seal 27. The solids then flow by means of conduit 31, preferably having a J-shaped configuration for seal purposes, into stripping unit 12 wherein there is maintained a mass 32 of catalytic solids. The level of the catalyst in reactor 11 is conveniently controlled by steam injected into the lift portion 68 of conduit 31 by line 34. Stripping gas, introduced by means of inlet 35, serves to remove occluded hydrocarbon from the surface of the catalytic particles. While it is generally preferred to maintain solids mass 32 in the form of a fluidized bed so as to ensure good mixing, relatively non-turbulent systems may also be applied to effect the desired stripping action.

Generally, the temperature of the stripping zone is approximately 850° to 1000° F., and a relatively long solids residence period of 5 to 20 minutes is employed. Heat exchange between the regenerator and the stripper is advantageously used to raise the stripping temperature, thus reducing the residence time for good stripping. One method for effecting heat exchange is merely to flow hot, untreated regenerator flue gas through outlet line 17, valve 36 and line 38 and into coil 33 immersed in the stripper solids mass, wherein it gives up its sensible heat by indirect heat exchange. The partially cooled flue gas may be then withdrawn through line 39 and 42 and discharged to the atmosphere or further utilized as a heat source. Simply using flue gas as it emanates from the combustion bed as a heat source is well known in the art. However, in a highly preferred embodiment of the present invention, a controlled amount of afterburning is induced in the flue gas by injecting or aspirating air through line 37 into the upflowing regenerator gases. Air or other oxygen-containing gas is advantageously introduced by passing the flue gas through passageway 55 of relatively sharply reduced cross section, the partial vacuum in the surrounding sections of the flue gas conduit serving to inspire the oxygen-containing gas into the flowing stream. The flue gases will contain appreciable quantities of combustible, e.g. carbon monoxide, formed by the carbonization-oxidation reaction within the regenerator bed. Additionally, a small quantity of combustible material may be introduced into the hot gases. The hot flue gases are thus superheated by combustion and, therefore, for the same volumetric flow through coil 33, increased heating of the stripping zone is affected. More effective stripping is thereby realized. In a manner similar to that described above, the superheated gases are then passed in indirect heat exchange with the stripper solids. If desired, superheated flue gas may be used to heat steam for stripping, supply heat to the after-cracker (by indirect heat exchange) and otherwise used as a heat source. While this method is preferred, alternate means of heating the stripper may be employed, as previously indicated. For flexibility, valve 41 is positioned in flue gas line 40 as a means of readily controlling the quantity of heat containing regeneration gas passed to stripper 12.

Stripper vapors, i.e. steam and volatilized hydrocarbons, are withdrawn overhead through passageway 51. While not shown, a solids separator or the like may be positioned at the entrance to conduit 51 so as to recover entrained solids. It is preferred to then pass the stripper vapors by means of line 25 into reaction zone 10, the vapors serving as a steam supply, feed material, and fluidization agent. The pressure in the stripper is normally higher than that in the thermal cracker by the static head of the catalyst between the reactor and the stripper bed levels plus the difference in pressure buildup in the J-bend below the stripper bed level in order that the stripper vapors flow in reactor transfer line 10. When required, jet ejector 53 and steam line 52 may be used to further boost the pressure of the stripped vapors. Although not normally practised, all or part of the stripped vapors may be recovered as such through line 54 and further processed in other conversion and/or separation zones, not shown.

Catalyst flows from the stripper into the regenerator, preferably through internal leg 45 which extends through the bottom head of the regenerator 13 so that shut off valve 46 is provided exterior of the burner vessel for control of catalyst flow. Additional control is also provided by air injected by line 47 into upflow leg 48 of the generally U-shaped solids passageway.

Summarized in the following tabular presentations are a compilation of data applicable to the practice of the present invention.

TABLE I

Process conditions

|  | Broad Range | Preferred Range | Example |
|---|---|---|---|
| Short residence reactor 10: |  |  |  |
| Average Solids Size, microns | 20–1,000 | 30–160 | 70 |
| Average Solids Temp., °F | 850–1,300 | 900–950 | 900 |
| Density of Solids Suspension, lb./cu. ft. | 2–15 | 2–5 | 4 |
| Maximum Fraction of Feed Cracked/Pass, wt. percent | 30–70 | 40–60 | 50 |
| Oil Residence Time, Before Solids Separation, sec | 2–10 | 2–5 | 3 |
| Steam Concentration in Reaction Zone, wt. percent | 0.5–20 | 8–12 | 5 |
| Thermal Cracker: |  |  |  |
| Temperature, °F | 850–1,300 | 900–1,000 | 900 |
| Pressure, p.s.i.g. | 5–20 | 8–12 | 11 |
| Aver. Vapor Res. Time sec | 10–150 | 40–70 | 60 |
| Percent of Feed Material Converted | 5–20 | 7–15 | 10 |
| Stripper: |  |  |  |
| Temperature, °F | 850–1,300 | 900–1,000 | 950 |
| Solids Residence Time, min | 5–20 | 5–10 | 7 |
| Regenerator: |  |  |  |
| Temperature, °F | 1,000–1,500 | 1,000–1,300 | 1,100 |
| Air Introduced into Flue Gas Stream, vol. percent O₂ based on flue gas | 1–7 | 2–5 | 2 |

TABLE II

Apparatus conditions, based on design illustrated

|  | Broad Range | Preferred | Example |
|---|---|---|---|
| Reactor 10: |  |  |  |
| Length, ft | 70–180 | 70–150 | 90 |
| Diameter, ft | 2–15 | 5–10 | 8 |
| Thermal Cracker 11: |  |  |  |
| Length, ft. (straight side) | 15–40 | 15–30 | 22 |
| Diameter, ft | 15–35 | 15–30 | 25'6" |
| Slope of Tapering Portion, degrees | 45–60 | 45 | 45 |
| Stripper: |  |  |  |
| Length, ft. (straight side) | 15–30 | 15–30 | 27 |
| Diameter, ft | 3–20 | 8–12 | 12 |
| Slope of Tapering Portion, degrees | 45–60 | 45 | 45 |
| Regenerator: |  |  |  |
| Length, ft. (straight side) | 20–35 | 20–35 | 30 |
| Diameter, ft | 20–45 | 20–40 | 33 |
| Overall Height of Stacked Units ft | 120–250 | 120–190 | 180 |

The present apparatus provides an enlarged (as compared with the first stage or primary reactor) zone for vapor phase cracking, from which catalytic solids flow downwardly, primarily under the forces of gravity and the static heads of the solids, through the various subsequent steps, i.e. stripping and regeneration. Normally, only a rough-cut cyclone need be used for separating the effluent of the transfer line reaction since the enlarged volume of the thermal after-cracking will provide desirable de-entraining action.

The stripping section, in addition to serving as a zone of occluded hydrocarbon recovery, acts as a solids seal between the hydrocarbon oil conversion zones, i.e. units 10 and 11, and combustion-regeneration zone 13.

By having the transfer line reaction zone external of the stacking units 11, 12 and 13, several advantages are realized. Any erosion of the transfer line can be readily corrected since the reaction zone is readily accessible to plant operators. Moreover, while any failure of an internal transfer line reaction zone would present an extremely serious safety hazard, i.e. hydrocarbons being exposed to the combustion supporting atmosphere of the regenerator zone, the present "external" reaction zone suffers from no such distadvantage.

Summarily, the present system offers a highly efficient means for converting hydrocarbon oil to more desirable light end fractions in a design encouraging stable catalyst circulation and effectively utilizing process heat and refinery area.

What is claimed is:

1. In a process for converting hydrocarbon oil by contacting said hydrocarbon oil with finely divided hot solids at a reaction temperature in a primary reaction zone and the effluent of said reaction zone is separated into vaporous reaction products and finely divided contact solids containing carbonaceous deposits and said vaporous reaction products are then passed to a secondary vapor phase reaction zone wherefrom they are ultimately withdrawn, and said finely divided solids are passed to a combustion zone for burning the carbonaceous deposits and heating said finely divided solids and whencefrom hot finely divided solids are circulated to said primary reaction zone, the improved method of supplying heat to said vaporous reaction products in said secondary vapor phase reaction zone which comprises subjecting a naphtha fraction to indirect heat exchange with the hot finely divided solids in said combustion zone to heat said naphtha fraction to a reforming temperature, and passing said thus heated naphtha fraction to said secondary vapor phase reaction zone to supply heat to and thermally crack said vaporous reaction products therein while thermally reforming said naphtha fraction.

2. The improved process of claim 1 wherein said contact solids are catalytic, said primary reaction zone is a short time, catalytic transfer line cracking zone and said secondary vapor phase reaction zone is a relatively long residence time, thermal after-cracking zone.

3. In a system wherein a hydrocarbon oil is converted by contact with hot finely divided catalytic solids at a conversion temperature in a conversion zone, said catalytic solids being separated from the vaporous conversion products leaving said reaction zone and being passed to a stripping zone for the removal of occluded hydrocarbons, stripped catalytic solids thereafter being passed to a fluid bed regeneration zone wherein carbonaceous deposits are burned and said catalytic solids art reheated for recirculation to said conversion zone, said stripping zone forming a sealing zone between said conversion zone and said regeneration zone and being maintained at a temperature between about 850° F. and 1300° F., the improved method of supplying heat to said stripping zone which comprises introducing air into the flue gas effluent of said regeneration zone to oxidize combustible material therein and to superheat said flue gas, and subjecting said superheated flue gas to indirect heat exchange with catalyst particles in said stripping zone to increase the temperature in said stripping zone and to obtain improved stripping of said catalyst particles.

4. The system of claim 3 wherein said flue gas leaves said regeneration zone through a withdrawal line and passes through a confined passageway of sharply reduced cross-section in said withdrawal line to inspirate air from the surrounding section and from an air inlet passageway leading into said withdrawal line at said reduced cross section.

5. A combination catalytic and thermal cracking conversion process which comprises the steps of upwardly flowing a rapidly moving catalytic solids mass in the form of a dilute gas-solids suspension at a temperature of 900 to 1300° F., introducing a suitably preheated hydrocarbon oil feed into said suspension, rapidly separating gasiform hydrocarbon material thus formed from said catalytic solids within 5 seconds from the time of introduction of said oil feed so that less than 60% of said feed undergoes catalytic cracking, downwardly circulating at least a portion of thus separated catalytic solids to a stripping zone wherein occluded hydrocarbons are removed from their surface by the action of stripping steam, injecting hydrocarbons containing steam from said stripping zone into said catalytic solids suspension, passing stripped catalytic solids downwardly to a burner zone wherein carbonaceous deposits on their surface are oxidized, recirculating thus heated catalytic solids to said solids suspension so as to supply requisite thermal energy, passing said separated gasiform hydrocarbon material to a separate vapor phase thermal cracking zone operating at a temperature of 900° to 1300° F., maintaining said material in said thermal cracking zone for a period of greater than 40 seconds so that at least 7 wt. percent of said hydrocarbon material undergoes thermal cracking zone as product.

6. The process of claim 5 wherein said burner zone operates at a temperature of about 1000° to 1400° F., and which further comprises, heating a naphtha fraction by indirect heat exchange with said catalytic solids undergoing regeneration in said burner zone, and introducing thus heated naphtha into said thermal cracking zone so as to supply heat thereto while simultaneously being thermally reformed.

7. The process of claim 5 wherein flue gas is withdrawn from said burner zone, oxygen-containing gas is introduced into said flue gas to oxidize combustible materials therein to superheat said flue gas, and said superheated flue gas is then utilized to supply heat to said stripping zone.

8. Apparatus for converting hydrocarbon oil to more desired, light products which comprises, in combination, an elongated conduit-like, short residence time reactor as a separate unit, a thermal cracking reactor of substantially greater width than said aforementioned reactor, a stripping unit, a regeneration vessel adapted to contain a mass of catalytic solids therein, said thermal cracking reactor, stripping unit and regeneration vessel being in stacked relationship progressing downwardly in the order described, conduit means for passing catalytic solids from said regeneration vessel to said elongated reactor in the form of a rapidly moving solids stream, means for introducing hydrocarbon oil feed into said solids stream, separation means for rapidly separating hydrocarbons from said solids, means for passing separated hydrocarbons to said thermal cracking reactor, withdrawal means for removing hydrocarbon products from said thermal cracking zone, conduit means for passing separated solids to said stripping unit, injection means for introducing stripping gas to said stripping unit and means for withdrawing stripped material therefrom, passage means for downwardly flowing stripped catalyst solids to said regeneration vessel, and means for introducing a combustion supporting gas thereto.

9. Apparatus according to claim 8 which further comprises circulation means for passing gasiform stripped material from said stripping unit to said elongated reactor, indirect heat exchange means positioned in the regeneration vessel for heating a naphtha fraction, and conduit means for passing thus heated naphtha to said thermal cracking reactor.

10. Apparatus for converting hydrocarbon oils which comprises, in combination, an elongated short residence time, reactor conduit as a separate unit, a regenerator vessel adapted to contain a mass of catalytic solids therein, a stripping unit in superposed relationship with respect to said regenerator vessel, a thermal cracking reactor in superposed relationship with respect to said stripping unit, and having a diameter substantially greater than said reactor conduit, means for withdrawing catalytic solids from said regenerator vessel and introducing them into said reactor conduit in the form of a rapidly moving, vertically flowing disperse solids stream, means for introducing hydrocarbon oil feed into said solids stream in said reactor conduit, separation means for rapidly separating hydrocarbons from said solids stream leaving said reactor conduit, said separation means being provided within said thermal cracking reactor thus discharging separated hydrocarbons and solids into said thermal cracking reactor, withdrawal means for removing hydrocarbon products from said thermal cracking reactor, conduit means for downwardly passing separated solids from said thermal cracking reactor to said stripping unit, means for introducing stripping gas to said stripping unit, means for withdrawing stripped vapors from said stripping unit, passageway means for downwardly flowing stripped solids into said regeneration vessel, means for introducing an oxygen-containing gas thereto and means for removing flue gas therefrom.

11. Apparatus according to claim 10 which further comprises conduit means for passing withdrawn stripped vapors from said stripping unit to said reactor conduit.

12. Apparatus according to claim 10 which further comprises a heat exchanger coil in said stripping unit, means for passing hot regenerator flue gas to said heat exchange coil, and conduit means for withdrawing partially cooled flue gas from said heat exchange coil.

13. Apparatus according to claim 10 wherein said thermal cracking reactor, stripping unit and regeneration vessel are in direct superposed relationship, said stripping unit is of substantially greater witdh than said reactor conduit, said conduit means for passing solids to said stripping unit has a J-shaped configuration, and said J-shaped conduit means is internally located in said stripping unit.

14. Apparatus according to claim 10 which further comprises indirect heat exchanging means located in said regenerator vessel for heating a naphtha fraction, and conduit means for introducing naphtha thus heated into said thermal cracking reactor.

15. Apparatus according to claim 12 which further comprises inlet means for introducing oxygen-containing gas into the regenerator flue gas being passed to said heat exchange coil in said stripping zone.

16. Apparatus according to claim 12 wherein positioned in said means for passing regenerator flue gas to said heat exchange coil in said stripping zone is a section of sharply reduced cross-sectional area, and which further comprises inlet means for introducing oxygen-containing gas into the flue gas in response to inspiration effect of said flue gas.

References Cited in the file of this patent
UNITED STATES PATENTS

| | | |
|---|---|---|
| 2,608,470 | Helmers et al. | Aug. 26, 1952 |
| 2,641,573 | Weikart | June 9, 1953 |
| 2,642,381 | Dickinson | June 16, 1953 |
| 2,731,395 | Jahnig et al. | Jan. 17, 1956 |
| 2,758,066 | Brackin | Aug. 7, 1956 |
| 2,758,073 | Krebs et al. | Aug. 7, 1956 |
| 2,763,600 | Adams et al. | Sept. 18, 1956 |
| 2,789,082 | Barr et al. | Apr. 16, 1957 |
| 2,852,441 | Martin et al. | Sept. 16, 1958 |